Reissued Sept. 21, 1954

Re. 23,873

UNITED STATES PATENT OFFICE 23,873

RETARDED CEMENT

Norman C. Ludwig, Chicago, Ill., assignor to Universal Atlas Cement Company, a corporation of Indiana No Drawing. Original No. 2,427,683, dated September 23, 1947, Serial No. 664,985, April 25, 1946. Application for reissue September 10, 1948, Serial No. 48,750

7 Claims. (Cl. 106—93)

Matter enclosed in heavy brackets [ ] appears in the original patent but forms no part of this reissue specification; matter printed in italics indicates the additions made by reissue.

This invention relates to cements having retarded rates of hydration or set, to slurries of such cement, and to the method of making these slurries. The cement with which the invention is concerned is a Portland or Portland-type cement.

Among the objects of the invention is the provision of a cement having a retarded rate of hydration, or a retarded set as it will be hereinafter termed, particularly at elevated temperatures such as are encountered in the cementing of deep wells.

Further objects of the invention reside in the provision of a slurry of the above cement, and in a method of making such slurry.

These and further objects of the invention will be more readily apparent in the following description.

In the cementing of oil wells it is customary to mix a hydraulic cement, for example a Portland or Portland-type cement, with the requisite amount of water to form a pumpable neat slurry, and to pump the mixture into the well and down the hole into the place where it is desired to have it harden. In present oil well drilling practice, with wells commonly ranging from 6,000 to 12,000 feet or more in depth, high temperatures are encountered at the locations which are to be cemented, and relatively long periods of time are often required to pump the slurry into place. Furthermore, in the customary practice of pumping the cement slurry down through the casing and either forcing it upward around the outer surface of the casing or through perforations in the lower end of the casing into the formation sought to be sealed, the slurry is required to pass through narrow channels and small openings. Successful placement of the slurry, therefore, requires that the slurry shall remain fluid and pumpable at high temeratures for several hours before it begins to harden. However, after the slurry has been pumped into place, it is desirable to have the hydration or set proceed at a rate at which the slurry will attain its final set and develop considerable strength within about 24 hours.

It has been found that Portland and Portland-type cement slurries can be retarded so that they meet all the above requirements for the satisfactory cementing of deep wells and like operations by the addition of carboxymethylcellulose (CMC) and salts of carboxymethylcellulose within certain definite limitations. More specifically, the cement and slurry of the present invention contain at least one of the group consisting of carboxymethylcellulose and salts of carboxymethylcellulose within the range of from .05 to .75% by weight of the dry cement. Ordinarily, it is preferred to use carboxymethylcellulose and salts of carboxymethylcellulose, either alone or in combination, so that the total of such additive lies within the range of from .05 to .64% by weight of the dry cement. It has been found that when used in hydraulic cement slurries in the above indicated amounts, carboxymethylcellulose and salts of carboxymethylcellulose act as retarders at elevated temperaures, the retarding effects becoming marked at 140° F. and continuing up to 220° F. and above. It has been found that carboxymethylcellulose and its salts are most effective as retarders in the higher temperature range of from 180° to 220° F. and above.

Carboxymethylcellulose, which is sold commercially in powder form, is a glycolic acid ether of cellulose. Carboxymethylcellulose is sometimes also termed "celluloseglycolic acid." It may be made by the reaction of monochloracetic acid upon alkali cellulose, the reaction yielding the alkali chloride and carboxymethylcellulose, which is representable by the formula:

$$C_6H_9O_4OCH_2COOH$$

Carboxymethylcellulose lends itself readily to salt formation with alkali metals as well as with various other metals. The sodium salt of carboxymethylcellulose, which is readily available commercially and for this reason ordinarily to be preferred in the practice of this invention, is a white, granular, colorless powder readily soluble or dispersible in water or alkaline solutions. It is to be understood, however, that other salts of carboxymethylcellulose may be employed in the practice of this invention, such salts including the alkali metal salts and the ammonium salt of carboxymethylcellulose, all of which are soluble in water, and other metal salts of carboxymethylcellulose such as the aluminum, iron, copper, lead, silver, mercury, nickel, and zinc salts, all of which are insoluble in water but which hydrolyze in alkaline solutions. The salts of carboxymethylcellulose may be prepared by either treating carboxymethylcellulose with a base containing the desired metal or by treating the sodium salt of carboxymethylcellulose in solution with a salt, such as the chloride of the desired metal, so that replacement occurs.

The cement employed may be any Portland or Portland-type hydraulic cement, the particular type used depending upon the particular application to be made of the cement or of the slurry, and of the properties demanded by such application, such as setting time, strength of the set slurry, and so forth. In making the test specimens of the cements within the invention, the results of tests on which are set forth below, cements of both the A. S. T. M. Type I and Type II, Portland type, were employed as indicated. The oxide composition of such cements and the specific surface as determined by the Wagner turbidimetric method are given below:

OXIDE COMPOSITION—PER CENT

| Cement | $SiO_2$ | $Al_2O_3$ | $Fe_2O_3$ | CaO | MgO | MnO | $SO_3$ | Loss on Ignition | Spec. Sur. Wagner, sq. cm./g. |
|---|---|---|---|---|---|---|---|---|---|
| Type II | 22.1 | 4.8 | 4.3 | 64.2 | 0.88 | 0.20 | 1.70 | 1.20 | 1,175 |
| Type I | 21.8 | 6.0 | 2.6 | 65.0 | 1.1 | 0.16 | 1.70 | 1.20 | 1,800 |

In the tests of cements in accordance with the invention neat slurries containing the indicated type of cement, water, and the indicated additive were made up, there being used in each case 100 parts by weight of the cement and 40 parts by weight of water. This gave a slurry which was typical of those employed in oil well cementing operations. The tests included the determination of the stiffening time of slurries at temperatures of 140°, 180°, 200° and 220° F., the determination of the consistency of the slurries at intervals while stirring, and the determination of compressive strengths of the set and cured cement structure resulting from such slurries.

The stiffening times and the consistencies of the slurries when at temperatures of 140°, 180°, and 200° F. were determined by use of an apparatus such as shown in Weiler Patent No. 2,122,765, dated July 5, 1938, which is known as the "Halliburton Consistometer," and is designed to test stirring or pumpability time of cement slurries at high temperatures. Such device consists essentially of a rotating cylindrical container with an internal paddle assembly fixed to a head whose movement is independent of the container. With the container filled with cement slurry, the force against the paddle due to rotation of the container and the viscosity of the slurry is transferred from the head of the apparatus to a pendulum lever arm by a suitable connection. The pendulum range is graduated from 0 to 10 divisions, represnting slurry viscosities of 0 to 100 poises, a pull of 10 divisions on the pendulum is considered to represent the limit of pumpability of the slurry in an oil well. The temperature of the slurry during the test was maintained at the degree indicated by a thermostatically controlled bath surrounding the container. In the following tables stiffening time was taken as the time from initiation of the test in the consistometer until the indicator on the pendulum showed a slurry viscosity of 100 poises.

The determination of the stiffening time of slurries at a temperature of 220° F. was carried out by use of a pressure consistometer such as described in Technical Publication No. 1207 of the American Institute of Mining and Metallurgical Engineers. Such tests were conducted under pressure small enough so that they had little effect on the stiffening times and were sufficient only to prohibit the evaporation of water from the slurry at the constant temperature of 220° F., which, of course, is above the boiling point of water. In such pressure consistometer the cell which contains the slurry is placed in a heated pressure cylinder and petroleum oil is pumped into the cylinder entirely surrounding the cell. At 220° F. it was necessary to subject the slurry to but from two to five pounds per square inch by means of the oil acting through the medium of the neoprene diaphragm interposed between the slurry and the oil. The apparatus works on the same principle as does the Halliburton Consistometer, but the standard method for operation of the pressure consistometer, which method was employed in the present tests, specifies a shearing rate of 47 R. P. M. and viscosity of 80 "poises" for termination of the test, such shearing rate being about twice that employed in the Halliburton Consistometer which as above pointed out, employs a viscosity of 100 poises for termination of the tests therein. At temperatures of 200° F. and lower, final stiffening times on the same slurries in the Halliburton Consistometer and the pressure consistometer check very closely.

The compressive strengths reported in the tables below were determined by making two-inch cubes which were molded from portions of the various cement slurries. When the molds were filled they were covered with metal plates and placed in the water of temperature baths operating at 140° and 200° F., as indicated. At approximately 20 hours the specimens were removed from the molds and returned to the temperature baths. Three cubes of each slurry were broken at 24 hours and three days by subjecting them to compression to destruction in a standard compression testing machine.

Carboxymethylcellulose and its salts can be added to the dry cement in powder form and intermixed therewith before the addition of water to form the slurry, or they can be added to the cement slurry in solution. The more practical method, from a commercial standpoint, is to employ carboxymethylcellulose or its water soluble salts and to add the material to the dry cement. In the tests reported in the tables below this was the method of addition employed, except where otherwise noted.

In cement slurries, especially when the slurries are mixed rapidly and consequently with high agitation, carboxymethylcellulose and its salts act as foam stabilizing agents and cause the entrainment of a considerable amount of air. In the usual methods of preparing slurries for use in oil wells, therefore, the addition of carboxymethylcellulose and its salts may cause foaming and frothing of the slurry, which is generally considered undesirable in oil well cementing operations. Such foaming and frothing of the slurry containing carboxymethylcellulose and its salts can be nullified by the use of defoaming agents, such as tributyl phosphate and pine oil. Such defoaming agents, when used, are added in small amounts, from .02 to .05% tributyl phosphate being typical, sufficient to suppress the foaming and frothing tendencies of carboxymethylcellulose and its salts on the slurry in the particular slurry mixing and pumping conditions employed. In each of the slurries tested which contained carboxymethylcellulose and its salts, .02% tributyl phosphate was added.

In the tables below carboxymethylcellulose is abbreviated "CMC" and the salts of carboxymethylcellulose are abbreviated with the symbol of the metal, or of the ammonium radical, as the case may be, prefixed to "CMC."

TABLE I

Stiffening time at constant temperature

| | Cement | Additive, percent | Stiffening Times at Temperatures Indicated | | | | | | | |
|---|---|---|---|---|---|---|---|---|---|---|
| | | | 140° F. | | 180° F. | | 200° F. | | 220° F. | |
| | | | Hr. | Min. | Hr. | Min. | Hr. | Min. | Hr. | Min. |
| 1 | Type II | None | 3 | 46 | 1 | 47 | 1 | 29 | 1 | 11 |
| 2 | do | Na—CMC 0.16 | 3 | 33 | 2 | 58 | 5 | 37 | 10 | 39 |
| 3 | Type I | None | 2 | 9 | 1 | 12 | 0 | 42 | 0 | 32 |
| 4 | do | Na—CMC 0.24 | 2 | 53 | 3 | 36 | 5 | 21 | 6 | 58 |

The stiffening time results given in Table I show that the sodium salt of carboxymethylcellulose, which, as will appear, is typical of carboxymethylcellulose and its other salts, is considerably more effective as a retarder at temperatures of 200° and 220° F. than at temperatures of 140° and 180° F. For some purposes, the relatively short stiffening times of slurries 2 and 4 at temperatures of 140° and 180° F., which are in general not markedly longer than those of slurries 1 and 3 at such temperatures, would not be particularly useful. Consequently, when the slurry is to be used at such lower temperatures, and particularly when carboxymethylcellulose and its salts form the sole retarding additive, it is necessary to use larger amounts of carboxymethylcellulose and its salts, if the stiffening time is to besubstantially prolonged. Examples of slurries containing sufficient sodium salt of carboxymethylcellulose to retard it to a marked degree are given in the following table.

TABLE II

Stiffening time at 140° F.

| | Cement | Additive, percent | Stiffening Time at 140° F. | |
|---|---|---|---|---|
| | | | Hr. | Min. |
| 1 | Type II | Na—CMC 0.32 | 3 | 45 |
| 2 | do | Na—CMC 0.64 | 4 | 57 |

As pointed out above, it is desirable in oil well cementing and like operations that the slurry remain easily pumpable over extended periods of time, even though it is subjected to high temperatures. The following Table III gives the results of slurry consistency tests run in the Halliburton Consistometer at a temperature of 200° F.

TABLE III

Slurry consistency at 200° F.

| | Cement | Additive, percent | Consistency in "Poises" at Times Indicated Stiffening Time | | | | | | | |
|---|---|---|---|---|---|---|---|---|---|---|
| | | | 15 min. | 30 min. | 1 hr. | 2 hr. | 3 hr. | 4 hr. | Hr. | Min. |
| 1 | Type II | None | 14 | 19 | 20 | ------ | ------ | ------ | 1 | 29 |
| 2 | do | Na—CMC 0.16 | 14 | 11 | 10 | 9 | 9 | 10 | 5 | 37 |
| 3 | Type I | None | 20 | 33 | ------ | ------ | ------ | ------ | 0 | 42 |
| 4 | do | Na—CMC 0.24 | 14 | 12 | 11 | 13 | 13 | 14 | 5 | 21 |

It may be seen from the above table that slurries 1 and 3 made with Type II and Type I cement, respectively, with no carboxymethylcellulose or salt of carboxymethylcellulose added hydrated at such rates that slurry 1 had stiffened sufficiently so that it had a consistency of 100 poises at 1 hour and 29 minutes, and that slurry 3 had stiffened sufficiently so that it had a slurry consistency of 100 poises at 42 minutes, thus showing that they were unfit for deep well cementing operations at 200° F. With both slurries 2 and 4, however, a consistency far below 100 poises was maintained throughout the entire period from the time of mixing to four hours after mixing, showing that such slurries remained pumpable for times which were adequate for cementing even the deepest wells.

The presence of carboxymethylcellulose and of the salts of carboxymethylcellulose in the slurries in amounts taught by the invention does not in the main adversely affect the strength of the cured cement structure resulting from the slurry when such cement structures are cured for three days either at 140° or 200° F. Furthermore, when cured for only 24 hours the strengths of the cement structures containing the additives are not markedly below those not containing the additives, showing that the structures resulting from the cements of the present invention develop an early strength fully adequate for the purpose in hand. The compressive strengths given in Table IV are the average values for three 2-inch cubes cured and tested as set out above.

TABLE IV

| | Cement | Additive, percent | Compressive Strength at Curing Temperature and Age Indicated, p. s. i. | | | |
|---|---|---|---|---|---|---|
| | | | 140° F. | | 200° F. | |
| | | | 24 Hr. | 3 Day | 24 Hr. | 3 Day |
| 1 | Type II | None | 2,737 | 4,860 | 4,269 | 4,625 |
| 2 | do | Na—CMC 0.16 | 2,423 | 5,227 | 3,450 | 6,230 |
| 3 | Type I | None | 4,093 | 5,780 | 3,063 | 3,327 |
| 4 | do | Na—CMC 0.24 | 3,107 | 5,733 | 3,925 | 4,900 |

In order to illustrate the use of various other salts of carboxymethylcellulose as set forth in the invention, as well as carboxymethylcellulose itself, and to show the various manners in which the additions may be made to the cement or slurry, there were made additional tests of stiffening times of 200° F. employing as additives, sodium, potassium, ammonium, aluminum, copper, and iron salts of carboxymethylcellulose, and carboxymethylcellulose itself. As before, the cement and water employed were in the ratio of 100 to 40 by weight. Under "Additive, percent," in Table V below, the additives denoted "(powder)" were added to the dry cement whereas those denoted "(solution)" were added to the slurries in the manner indicated by the notes below the table.

TABLE V

| | Cement | Additive, Percent | Stiffening Time | |
|---|---|---|---|---|
| | | | Hr. | Min. |
| 1 | Type II | None | 1 | 29 |
| 2 | do | Na—CMC—0.16 (powder) | 5 | 37 |
| 3 | do | CMC—0.15 (powder) | 3 | 0 |
| 4 | do | CMC—0.30 (powder) | 7 | 6 |
| 5 | do | K—CMC—0.075 (solution) [1] | 3 | 54 |
| 6 | do | K—CMC—0.15 (solution) [1] | 8 | 41 |
| 7 | do | $NH_4$—CMC—0.15 (solution) [2] | 3 | 21 |
| 8 | do | $NH_4$—CMC—0.30 (solution) [2] | 9 | 7 |
| 9 | do | Al—CMC—0.15 (powder) | 2 | 41 |
| 10 | do | Al—CMC—0.30 (powder) | 4 | 50 |
| 11 | do | Cu—CMC—0.50 (powder) | 2 | 15 |
| 12 | do | Cu—CMC—0.75 (powder) | 2 | 28 |
| 13 | do | Fe—CMC—0.50 (powder) | 3 | 33 |
| 14 | do | Fe—CMC—0.75 (powder) | 4 | 59 |

[1] 200 g. water+1.29 g. KOH+4 g. CMC.
[2] 200 g. water+3 ml. 28% $NH_4OH$+4 g. CMC.

The stiffening times at 200° F. given in Table V show that the water soluble salts of carboxymethylcellulose, that is, sodium, potassium, and ammonium salts, as well as carboxymethylcellulose itself, which is also water soluble, are considerably more effective retarders than are the water insoluble salts. The mechanism of retarding the hydration of cements is not fully understood, and so it is not desired that the invention be confined to a particular theory of operation. It is believed, however, that the water insoluble salts of carboxymethylcellulose hydrolyze in alkaline solutions such as are formed when the cement is mixed with water. Such hydrolysis is believed to proceed to such an extent that a portion of the water insoluble metal salt of carboxymethylcellulose is free to produce the same retardation in the cement as, but to a somewhat more limited degree than, that of the water soluble salts.

As set out in application Serial No. 664,984 filed of even date, it has been found that hydroxyethylcellulose as an additive within the range .05 to .60%, and preferably within the range .05 to .50%, by weight of the dry cement, is an effective retarder for hydraulic cement slurries, particularly within the temperature range 140° to 180° F. It has been found that hydroxyethylcellulose and carboxymethylcellulose and its salts do not adversely affect each other when both are present in a slurry but, on the contrary, that each supplements the action of the other. As a consequence, a cement slurry containing carboxymethylcellulose and salts of carboxymethylcellulose in amounts within the present invention and hydroxyethylcellulose from .05 to .60%, preferably .05 to .50%, by weight of the dry cement, will be effectively retarded in its setting time over a temperature range from 140° to 220° F. and above.

It will be obvious that for each chosen percentage within the invention of the additive consisting of at least one of the group consisting of carboxymethylcellulose and salts of carboxymethylcellulose there will be a corresponding percentage of hydroxyethylcellulose which when added to the slurry will produce a slurry having a substantially constant stiffening time over the entire temperature range of 140° to 220° F. and above. As specific examples of such slurry having substantially constant stiffening times over such temperature range, there are set out in Table VI below two slurries, Nos. 2 and 3, containing both hydroxyethylcellulose and a sodium salt of carboxymethylcellulose, the quantities of the two additives being so adjusted as to give the slurry a substantially constant stiffening time. It is to be understood that such examples are illustrative only, and that numerous variations are possible. In each of the slurries set out in Tables VI and VII 100 parts by weight of the cement and 40 parts by weight of water were employed.

TABLE VI

Stiffening time at constant temperature

| | Cement | Additive, percent | Stiffening Times at Temperatures Indicated | | | | | | | |
|---|---|---|---|---|---|---|---|---|---|---|
| | | | 140° F. | | 180° F. | | 200° F. | | 220° F. | |
| | | | Hr. | Min. | Hr. | Min. | Hr. | Min. | Hr. | Min. |
| 1 | Type II | None | 3 | 46 | 1 | 47 | 1 | 29 | 1 | 11 |
| 2 | do | 0.06 Na—CMC+0.125 HEC | 6 | 28 | 5 | 16 | 5 | 11 | 3 | 46 |
| 3 | do | 0.08 Na—CMC+0.125 HEC | 6 | 20 | 5 | 40 | 6 | 33 | 5 | 12 |

It will be seen that slurries 2 and 3 have stiffening times particularly from 140° to 200° F. which are substantially constant. The temperature range over which the slurry has a substantially constant stiffening time may be extended to 220° F. and above. This is illustrated by slurry 3, in which the ratio of the weights of hydroxyethylcellulose and sodium salt of carboxymethylcellulose are somewhat different from that employed in slurry 2.

The presence in the slurry of both hydroxyethylcellulose and carboxymethylcellulose or its salts displays an additional advantage in that the strength of the cement structure resulting from the slurry containing both additives is markedly increased. Such increased strength is obtained both when such structure is cured at 140° and when it is cured at 200° F., as illustrated by the following table.

TABLE VII

Compressive strengths when cured at 140° and 200° F.

| | Cement | Additive, percent | Compressive Strength at Curing Temperature and Age Indicated, p. s. i. | | | |
|---|---|---|---|---|---|---|
| | | | 140° F | | 200° F. | |
| | | | 24 Hr. | 3 Day | 24 Hr. | 3 Day |
| 1 | Type II | None | 2,737 | 4,860 | 4,268 | 4,625 |
| 2 | do | 0.08 Na—CMC+0.125 HEC | 3,783 | 6,230 | 5,027 | 6,180 |

Whereas I have disclosed preferred compositions of the cement, cement slurries and methods of making them, it is to be understood that the invention is capable of considerable variation as to details. I, therefore, claim as new the following:

[1. A cement capable of forming a fluid slurry when mixed with water, said cement having a retarded set at temperatures above atmospheric, said cement comprising a hydraulic cement mixed with a minor proportion of at least one of the group consisting of carboxymethylcellulose and salts of carboxymethylcellulose.]

[2. A cement capable of forming a fluid slurry when mixed with water, said cement having a retarded set at temperatures above atmospheric, said cement comprising Portland cement mixed with a minor proportion of at least one of the group consisting of carboxymethylcellulose and salts of carboxymethylcellulose.]

[3. A cement capable of forming a fluid slurry when mixed with water, said cement having a retarded set at temperatures above atmospheric, said cement comprising a hydraulic cement mixed with from .05 to .75% by weight of the dry cement of at least one of the group consisting of carboxymethylcellulose and salts of carboxymethylcellulose.]

[4. A cement capable of forming a fluid slurry when mixed with water, said cement having a retarded set at temperatures above atmospheric, said cement comprising Portland cement mixed with from .05 to .75% by weight of the dry cement of at least one of the group consisting of carboxymethylcellulose and salts of carboxymethylcellulose.]

[5. A cement capable of forming a fluid slurry when mixed with water, said cement having a retarded set at temperatures above atmospheric, said cement comprising Portland cement mixed with from .05 to .64% by weight of the dry cement of at least one of the group consisting of carboxymethylcellulose and salts of carboxymethylcellulose.]

[6. A hydraulic cement slurry having a retarded setting time at temperatures above atmospheric, comprising a hydraulic cement, water, and a minor proportion of at least one of the group consisting of carboxymethylcellulose and salts of carboxymethylcellulose.]

[7. A hydraulic cement slurry having a retarded setting time at temperatures above atmospheric, comprising Portland cement, water, and a minor proportion of at least one of the group consisting of carboxymethylcellulose and salts of carboxymethylcellulose.]

[8. A hydraulic cement slurry having a retarded setting time at temperatures above atmospheric, comprising Portland cement, water, and from .05 to .75% by weight of the dry cement of at least one of the group consisting of carboxymethylcellulose and salts of carboxymethylcellulose.]

[9. A hydraulic cement slurry having a retarded setting time at temperatures above atmospheric, comprising Portland cement, water, and from .05 to .64% by weight of the dry cement of at least one of the group consisting of carboxymethylcellulose and salts of carboxymethylcellulose.]

[10. A hydraulic cement slurry adapted to be used in well cementing operations and having a retarded setting time at temperatures above atmospheric, consisting essentially of Portland cement, water in a quantity sufficient to render the slurry pumpable, and from .05 to .64% by weight of the dry cement of the sodium salt of carboxymethylcellulose.]

[11. A method of forming fluid hydraulic cement slurries adapted to be used in well cementing operations and having a retarded setting time at temperatures above atmospheric, which comprises the steps of forming a hydraulic cement slurry containing a minor proportion of at least one of the group consisting of carboxymethylcellulose and salts of carboxymethylcellulose, the remainder of said slurry consisting essentially of hydraulic cement and water.]

[12. A method of forming fluid hydraulic cement slurries adapted to be used in well cementing operations and having a retarded setting time at temperatures above atmospheric, which comprises the steps of forming a hydraulic cement slurry containing from .05 to .75% by weight of the dry cement of at least one of the group consisting of carboxymethylcellulose and salts of carboxymethylcellulose, the remainder of said slurry consisting essentially of Portland cement and water.]

[13. A method of forming fluid hydraulic cement slurries adapted to be used in well cementing operations and having a retarded setting time at temperatures above atmospheric, which comprises the steps of forming a hydraulic cement slurry containing from .05 to .64% by weight of the dry cement of at least one of the group consisting of carboxymethylcellulose and salts of carboxymethylcellulose, the remainder of said slurry consisting essentially of Portland cement and water.]

14. A cement capable of forming a fluid slurry when mixed with water, said cement having a retarded set at temperatures above atmospheric, said cement comprising a hydraulic cement mixed with a minor proportion of at least one of the group consisting of carboxymethylcellulose and salts of carboxymethylcellulose, and with a minor proportion of hydroxyethylcellulose.

15. A cement capable of forming a fluid slurry when mixed with water, said cement having a retarded set of temperatures above atmospheric, said cement comprising a Portland cement mixed with a minor proportion of at least one of the group consisting of carboxymethylcellulose and salts of carboxymethylcellulose, and with a minor proportion of hydroxyethylcellulose.

16. A cement capable of forming a fluid slurry when mixed with water, said cement having a retarded set at temperatures above atmospheric, said cement comprising Portland cement mixed with from .05 to .75% by weight of the dry cement of at least one of the group consisting of carboxymethylcellulose and salts of carboxymethylcellulose, and with from .05 to .60% hydroxyethylcellulose by weight of the dry cement.

17. A cement capable of forming a fluid slurry when mixed with water, said cement having a retarded set at temperatures above atmospheric, said cement comprising Portland cement mixed with from .05 to .64% of the sodium salt of carboxymethylcellulose by weight of the dry cement, and with from .05 to .50% hydroxyethylcellulose by weight of the dry cement.

18. A hydraulic cement slurry adapted to be used in well cementing operations and having a retarded setting time at temperatures above atmospheric, consisting essentially of Portland cement, water in a quantity sufficient to render the slurry pumpable, and from .05 to .75% by weight of the dry cement of at least one of the group consisting of carboxymethylcellulose and salts of carboxymethylcellulose, and from .05 to .60% hydroxyethylcellulose by weight of the dry cement.

19. A hydraulic cement slurry adapted to be used in well cementing operations and having a retarded setting time at temperatures above atmospheric, consisting essentially of Portland cement, water in a quantity sufficient to render the slurry pumpable, and from .05 to .64% by weight of the dry cement of at least one of the group consisting of carboxymethylcellulose and salts of carboxymethylcellulose, and from .05 to .50% hydroxyethylcellulose by weight of the dry cement.

20. A hydraulic cement slurry adapted to be used in well cementing operations and having a retarded setting time at temperatures above atmospheric, consisting essentially of Portland cement, water in a quantity sufficient to render the slurry pumpable, and from .05 to .64% by weight of the dry cement of at least one of the group consisting of carboxymethylcellulose and salts of carboxymethylcellulose, and from .05 to .50% hydroxyethylcellulose by weight of the dry cement, the hydroxyethylcellulose content being so adjusted relative to the content of the group consisting of at least one the following: carboxymethylcellulose and salts of carboxymethylcellulose, that the slurry has a substantially constant stiffening time over the temperature range of from 140° to 220° F.

References Cited in the file of this patent or the original patent

UNITED STATES PATENTS

| Number | Name | Date |
|---|---|---|
| 2,290,956 | Gruenwald | July 28, 1942 |
| 2,476,306 | King | July 19, 1949 |
| 2,655,004 | Wertz | Oct. 13, 1953 |